(12) United States Patent
Mosites et al.

(10) Patent No.: US 8,328,642 B2
(45) Date of Patent: Dec. 11, 2012

(54) GAME BASED INCENTIVES FOR COMMERCE

(75) Inventors: Donald C. Mosites, San Francisco, CA (US); Justin Waldron, San Francisco, CA (US); Shantanu Talapatra, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 183 days.

(21) Appl. No.: 12/816,584

(22) Filed: Jun. 16, 2010

(65) Prior Publication Data

US 2011/0312423 A1 Dec. 22, 2011

(51) Int. Cl.
*A63F 9/24* (2006.01)
(52) U.S. Cl. .......................................... 463/42
(58) Field of Classification Search ............. 463/42
See application file for complete search history.

(56) References Cited

U.S. PATENT DOCUMENTS

| | | | | |
|---|---|---|---|---|
| 5,794,210 A | * | 8/1998 | Goldhaber et al. | 705/14.69 |
| 2004/0259613 A1 | | 12/2004 | Machida | |
| 2005/0192896 A1 | | 9/2005 | Hutchison et al. | |
| 2006/0106734 A1 | | 5/2006 | Hoffman et al. | |
| 2007/0050245 A1 | | 3/2007 | Humphries, IV et al. | |
| 2007/0072678 A1 | | 3/2007 | Dagres | |
| 2007/0087798 A1 | | 4/2007 | McGucken | |
| 2008/0188308 A1 | | 8/2008 | Shepherd et al. | |
| 2008/0220869 A1 | * | 9/2008 | Midgley et al. | 463/40 |
| 2008/0229098 A1 | | 9/2008 | Ishak | |
| 2009/0265460 A1 | | 10/2009 | Balasubramanian et al. | |
| 2010/0069148 A1 | | 3/2010 | Cargill | |
| 2010/0174593 A1 | | 7/2010 | Cao et al. | |
| 2011/0118004 A1 | | 5/2011 | Kelly et al. | |
| 2011/0151979 A1 | * | 6/2011 | Boesen et al. | 463/43 |
| 2012/0015716 A1 | | 1/2012 | Mosites et al. | |
| 2012/0015717 A1 | | 1/2012 | Mosites et al. | |
| 2012/0016726 A1 | | 1/2012 | Mosites et al. | |
| 2012/0077596 A1 | * | 3/2012 | Ocko et al. | 463/42 |
| 2012/0078395 A1 | * | 3/2012 | Ocko et al. | 700/91 |
| 2012/0150695 A1 | * | 6/2012 | Fan et al. | 705/27.1 |

OTHER PUBLICATIONS

"U.S. Appl. No. 13/244,797 Response to Office Action", 12 pgs.
"U.S. Appl. No. 13/244,797, Non Final Office Action mailed Dec. 16, 2011", 8 pgs.
"U.S. Appl. No. 13/244,803 , Response filed Mar. 15, 2012 to Non Final Office Action mailed Dec. 15, 2011", 10 pgs.
"U.S. Appl. No. 13/244,803, Non Final Office Action mailed Dec. 15, 2011", 7 pgs.
"U.S. Appl. No. 13/244,822, Non Final Office Action mailed Feb. 1, 2012", 20 pgs.
"Application Serial No., Response filed May 1, 2012 to Non Final Office Action mailed Feb. 1, 2012", 12 pgs.
"International Application Serial No. PCT/US2011/040715, Search Report mailed Dec. 7, 2011", 2 pgs.
"International Application Serial No. PCT/US2011/040715, Written Opinion mailed Dec. 7, 2011", 8 pgs.

* cited by examiner

*Primary Examiner* — Pierre E Elisca
(74) *Attorney, Agent, or Firm* — Schwegman, Lundberg & Woessner, P.A.

(57) ABSTRACT

The present disclosure generally relates to systems and methods directed to generating game-based incentives for users of online games to purchase goods in an electronic commerce system.

33 Claims, 5 Drawing Sheets

GAME BASED INCENTIVES FOR COMMERCE

TECHNICAL FIELD

The present disclosure generally relates games and applications in general and in particular to computer-implemented online games, such as online role-playing games (RPGs), playable by more than one person from more than one location.

BACKGROUND

In many games, there is a virtual world or some other imagined playing space where a player of the game controls one or more player characters (herein "character," "player character," or "PC"). Player characters can be considered in-game representations of the controlling player. As used here, the terms "player," "user," "entity," and "friend" may refer to the in-game player character controlled by that player, user, entity, or friend, unless context suggests otherwise. The game display can display a representation of the player character. A game engine accepts inputs from the player, determines player character actions, decides outcomes of events and presents the player with a game display illuminating what happened. In some games, there are multiple players, wherein each player controls one or more player characters.

In many computer games, there are various types of in-game rewards (aka "assets" or "loot") that a player character can obtain within the game. For example, a player character may acquire game points, gold coins, experience points, character levels, character attributes, virtual cash, or other in-game items of value. In some games, the goal of the game may be to acquire in-game rewards. For example, a player may strive to achieve a high score by accumulating points that are granted for performing in-game tasks or overcoming in-game obstacles.

Many websites allow users to conduct a variety of actions online, such as view content, write reviews, order items, etc. These websites often present the user with a plurality of actions to choose from and allow the user to select the type of action he would like to perform. Once the action is selected, the website typically redirects the client system of the user to a webpage where the action can be completed.

For example, some websites allow users to view and purchase goods and services in online merchant catalogs. The goods can include items (e.g., digital music files) that are delivered electronically to the user over the Internet and items (e.g., books) that are delivered through conventional distribution channels (e.g., a common carrier). As used herein, a "user" is a potential purchaser of an item from an online merchant, wherein the user may have an account established with the online merchant system. Some websites also allow users to rent items and purchase downloadable items such as software programs and digital publications. As used herein, an "item" can include a good, service, or downloadable item offered by an online merchant. Similarly, as used here, a "purchase" (or "order") can include buying, renting, or licensing an item from an online merchant. A merchant networking system may provide an electronic version of a catalog that lists the items that are available for purchase. A user may view the online merchant catalog using a browser client and select various items that are to be ordered. When the user has completed selecting the items to be ordered, the merchant networking system may then prompt the user for information to complete the ordering of the items. This user-specific order information may include the user's name, credit card number, and a shipping address for the order. The merchant networking system then typically confirms the order by redirecting the client system of the user to an order confirmation webpage.

Internet users may maintain one or more accounts with various service providers, including online gaming systems, social networking systems, merchant systems, etc. Internet users typically access webpages using browser clients (e.g., Firefox, Chrome, Internet Explorer, etc.). Most browser clients support a domain security model that only allows interactions with content from the same origin. For example, an object of an iframe corresponding to one domain (e.g., http://amazon.com/) may not access the content of another frame or the base document, if the content is sourced from another domain (e.g., http://zynga.com/). As to Javascript, for instance, to prevent cross-site security problems, browsers enforce the same origin policy in the javascript object model. That is, scripts running in one iframe may not access any objects inside another iframe, unless both pages in the iframes come from the same origin. Some browsers consider two pages to have the same origin if the protocol, port (if given), and host are the same for both pages.

A service provider may serve HTML documents, including a third-party module or references (e.g., src attribute) to a third-party module, in iframes, <divs>, <frames>, or other document sections corresponding to a different origin or domain from the base document, as well as documents embedded in other iframes. In this manner, operation of a given third-party module is effectively contained within the context of its corresponding iframe

DESCRIPTION OF EXAMPLE EMBODIMENTS

Game Systems

Figure 1:
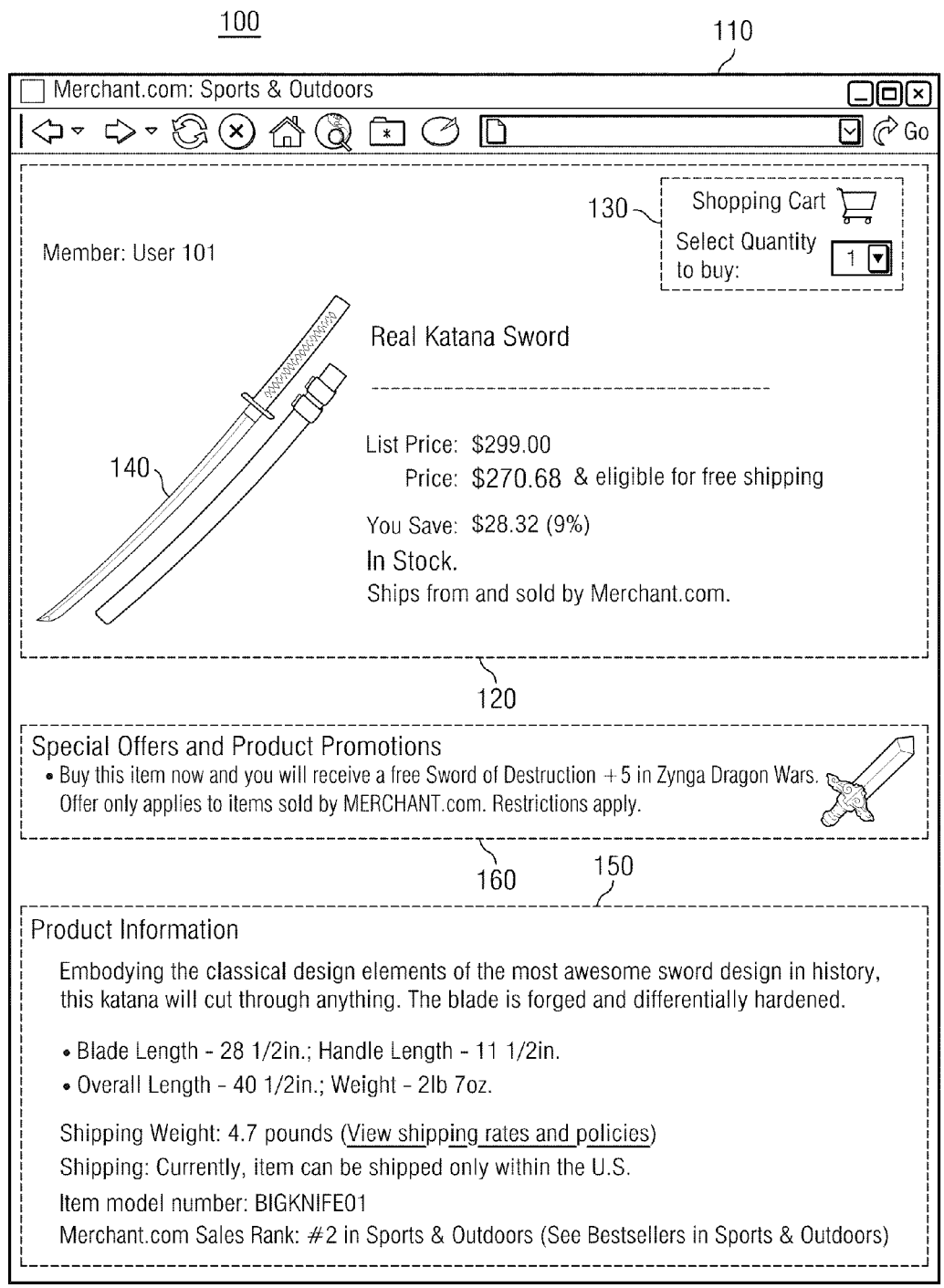
FIG. 1 illustrates the display of a webpage describing an item that may be purchased and an offered incentive reward.

In an online multiplayer game, players control player characters (PCs), a game engine controls non-player characters (NPCs) and game features, and the game engine also manages player character state and tracks state for currently active (i.e., online) players and currently inactive (i.e., offline) players. A player character can have a set of attributes associated with the player character. As used herein, the term "player character state" can refer to one or more in-game characteristics of a player character, such as location, assets, levels, condition, health, status, inventory, skill set, name, orientation, affiliation, specialty, and so on. The game engine may use player character state to determine the outcome of game events, sometimes also considering set or random variables. Generally, a player character's probability of having a more favorable outcome is greater when the player character has a better state. For example, a healthier player character is less likely to die in a particular encounter relative to a weaker player character or non-player character.

A game event may be an outcome of an engagement, a provision of access, rights and/or benefits or the obtaining of some assets (e.g., health, money, strength, inventory, land, etc.). A game engine determines the outcome of a game event according to game rules (e.g., "a character with less than 5 health points will be prevented from initiating an attack"), based on character state and possibly also interactions of other current player characters and possibly also a random calculation. Engagements can include simple tasks (e.g., cross the river, shoot at an opponent), complex tasks (e.g., win a battle, unlock a puzzle, build a factory, rob a liquor store), or other events.

In various embodiments, an online multiplayer game can provide a mechanism for player characters to acquire in-game rewards. In some embodiments, a reward can provide an in-game benefit for the player character by improving the player character's state. The improved character state could increase the player character's likelihood or ability to advance in the game, or otherwise improve game play. For example, rewards could be character levels, ability points, skill points, hit points, mana points, combat bonuses, etc. Rewards can also be virtual representations of real life things such as cash, precious valuables, personal property, real property, weapons, vehicles, titles, jobs, etc. Rewards can also include mythical and fantasy things, such as manna, game keys, magical items, potions, relics, artifacts, etc. Typical in-game benefits include special abilities, enchanted items, or game keys, wherein these benefits may allow the player character to advance at a more rapid rate or satisfy a gate condition that allows the player character to advance past a certain point in the game. Benefits may also include in-game authority, rights, or status.

An online multiuser game can be hosted by a game networking system 320b, which can be accessed over any suitable network with an appropriate client system 330. A player may have a game system account on game system 320b, wherein the game system account can contain a variety of information about the player (e.g., the player's personal information, player character state, game state, etc.). In some embodiments, a player may play multiple games on game networking system 320b, which may maintain a single game system account for the player with respect to all the game, or multiple individual game system accounts for each game with respect to the player.

Merchant Systems

FIG. 1 illustrates the display of an item catalog webpage describing an item that may be ordered from a merchant networking system 320a. The webpage illustrated in FIG. 1 may be automatically generated and presented to the user in response to activating the corresponding link in response to the user visiting or accessing the merchant's website from client system 330 with a browser client 110. This example webpage contains a purchasing information section 120, a shopping cart section 130, and a product information section 150. The shopping cart section 130 provides the conventional capability to add the described item to a shopping cart. The merchant system 320a adds the purchasing information, production information, and the shopping cart sections to each webpage for an item that may be ordered. One skilled in the art would appreciate that these various sections can be omitted or rearranged or adapted in various ways.

In various embodiments, the merchant networking system 320a can assign a unique client identifier to each client system 330. The merchant system 320a maps each client identifier to a user that may use that client system to place an order. The merchant networking system 320a can determine that the user is visiting the site by reading the user's cookie, which may be appended to HTTP requests transmitted by the client system 330, and/or by the user logging onto the site. A user may have a merchant system account on merchant system 320a, wherein the merchant system account can contain a variety of information about the user (e.g., the user's personal information, financial information, purchase history, etc.).

The selection of various items from the electronic catalog is generally based on the "shopping cart" model. When the user selects an item from the electronic catalog, the merchant system 320a metaphorically adds that item to a shopping cart. When the user is done selecting items, then all the items in the shopping cart are "checked out" (i.e., ordered) when the user provides billing and shipment information. In some models, when a user selects any one item, then that item is "checked out" by automatically prompting the user for the billing and shipment information. The user is then presented with an order webpage that prompts the user for the user-specific order information to complete the order. That webpage may be prefilled with information that was provided by the user when placing another order. The information is then validated by merchant system 320a, and the order is completed. At this point, the user may be presented with an order confirmation webpage that displays the details to the order.

Offering In-Game Rewards as Incentives During Merchant Transactions

A player of an online multiplayer game may also be a user of an online merchant system. Many users of merchant systems may browse an item in an online catalog without ordering it. Consequently, online merchants may find it desirable to provide some type of incentive to encourage these users to place an order. Some users may be incentivized to place an order on the merchant system when the incentive is an in-game reward in an online multiplayer game.

Figure 2:
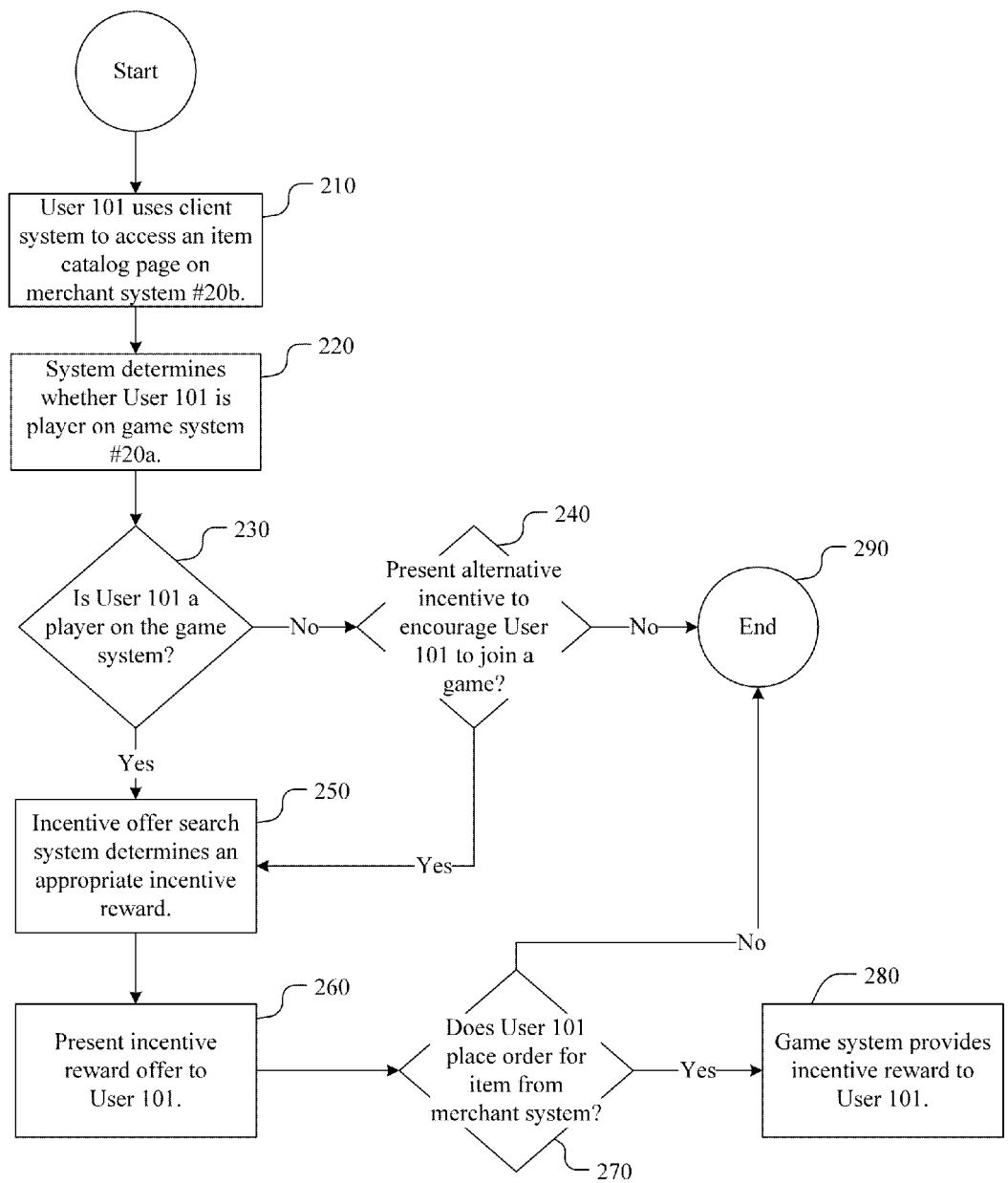
FIG. 2 shows a flowchart illustrating an example process for offering incentive rewards during a merchant transaction.

FIG. 2 shows a flowchart illustrating an example process for offering incentive rewards during a transaction on an online merchant system. In various embodiments, the player/user (hereinafter "user"), when accessing 210 a item catalog webpage on a particular merchant system 320a, may be offered an incentive to order that item, wherein the incentive is some type of in-game reward in a particular multiuser online game hosted by gaming system 320b. As used herein, an "incentive reward" (or simply "reward") means some type of in-game asset, award, attribute, or benefit on game system 320b. For example, the incentive reward may be game points, gold coins, experience points, character levels, character attributes, virtual cash, virtual items, etc.

In general, incentive rewards will provide some type of in-game benefit. For example, the incentive reward could be an in-game virtual item (e.g., a Sword of Destruction +5) that provides a particular in-game benefit (e.g., increasing a player character's ability to defeat in-game opponents). However, it is possible that an incentive reward provides no direct in-game benefit, and merely has prestige or other unquantifiable value. For example, the incentive reward could be a virtual decoration (e.g., a virtual medal, ribbon, or badge) that provide no quantifiable in-game benefit, but may be desirable nonetheless (e.g., getting a virtual bronze star in an online military game may provide prestige or other intangible benefits to a player). In some games, receiving such decorations may be the purpose of the game.

Incentive Offer Search System

Various embodiments may include an incentive offer search system, which is a network addressable system that is operative to generate and/or select an incentive reward in response to a request from a remote system, such as game networking system 320b or merchant networking system 320a. The offer search system may be a central system accessible to one or more systems over a wide area network, or a local system accessible to a single domain. The present disclosure assumes the offer search system is a subsystem of game system 320b, however it is possible that the offer search system is part of merchant networking system 320a or even an independent remote system.

In one implementation, the offer search system includes one or more physical servers and an offer data store. In one implementation, offer data store stores content information containing offer creative content and URLs or identifiers to content or other resources hosted by game system 320b. The content may be stored in association with player information from game system 320b.

Determining an Incentive Reward

In various embodiments, the incentive offer search system determines an appropriate reward to offer to potential purchasers on merchant system 320a. The in-game reward offered by the incentive offer search system to the user of a merchant system can be determined by a variety of methods (e.g., statically, randomly, dynamically, etc.) at step 220.

In some embodiments, the incentive reward will be determined statically, such that the offered reward is the same for all users of merchant system 320a. For example, if a user views a merchant catalog webpage for a lawnmower on merchant system 320a, the user might be offered an incentive reward of $20,000 in virtual poker chips for ordering the lawnmower, and this same reward would be offered to all purchasers of this item.

In some embodiments, the incentive reward will be determined dynamically, such that the offered reward may vary based on a variety of factors. For example, the offer search system can consider the item's product details, the user's merchant system account information, the user's game system account information, other game system and merchant system data, etc.

In various embodiments, the incentive reward for purchasing a particular item can analyze the user's game account information on game system 320b when determining the incentive reward to offer. The offer search system can access the user's game account to retrieve various game state data (e.g., the user's player character state) and then identify an incentive reward appropriate for that user based on that data. For example, the offer search system may query game system 320b to determine that User 101 is a player in Zynga Dragon Wars and that User 101's player character is a 5th level elf. The offer search system may then determine that an Elven Invisibility Cloak is an appropriate incentive reward for a 5th level elf.

In various embodiments, the incentive reward for purchasing a particular item from merchant system 320a can vary over time. The offer search system may offer a better reward to a user of merchant system 320a who places an order more quickly. For example, an incentive reward for purchasing lawnmower within the next hour may be $20,000 virtual poker chip, but if it is purchased afterwards, the incentive reward may decrease to only $10,000 virtual poker chips.

In one embodiment, the incentive reward may only be offered for a limited time. For example, an incentive reward of a virtual sports car might only be offered to the first one hundred users who order a toaster on merchant system 320a. In a variation of this embodiment, the incentive reward may become less attractive for subsequent purchasers. For example, the first person to order a toaster from the merchant system will get a virtual Porsche 911, while later persons will be offered virtual Ford Pintos. The offer search system may present offers such that it is not apparent to the user of merchant system 320a whether he will get the better item or not. For example, while viewing the catalog page of a toaster on merchant system 320a, the user might be presented with an offer that states, "Limited time offer! The first person to buy a toaster today will receive a virtual Porsche 911 in Zynga YoVille (subsequent buyers will receive a virtual Ford Pinto)." In this case, the user viewing this offer may not know whether he will be the first purchaser, and may only find out after the order is placed (e.g., on the order confirmation page).

In another embodiment, the offer search system may only offer a percentage chance of receiving an incentive reward. For example, a user of merchant system 320a may be offered a specific percentage chance (e.g., 20%, 40%, 75%, etc.) to receive a particular incentive reward (e.g., a virtual Porsche 911). After the order is placed, the game system 320b could then determine if the user actually receives the incentive reward.

In another embodiment, the offer search system may only offer an unknown incentive reward. For example, when User 101 accesses an item catalog page on merchant system 320a, the offer search system may generate an offer for a "mystery reward" for User 101 and present an offer that states "Purchase this item now and receive a surprise reward in Zynga Dragon Wars!" The user may not discover what the "mystery reward" is until an order is actually placed with merchant system 320a, or possibly even later (e.g., the next time the user logs into game system 320b).

In another embodiment, the offer search system can analyze the details of the item offered for sale on merchant system 320a when determining the incentive reward to offer. The offer search system can query merchant system 320a or otherwise determine the details of the item by a variety of means. For example, the offer search system, as discussed below, may access merchant system 320a and analyze the item catalog page for text, keywords, prices, concepts, meta tags, etc. With one or more details of the item, the offer search system can consider thematic, categorical, and other factors to determine an appropriate incentive reward. For example, the incentive reward for purchasing a toaster on merchant system 320a might be a virtual toaster in Zynga YoVille. In the example shown in FIG. 1, the incentive reward for purchasing a real katana could be a Sword of Destruction +5 in Zynga Dragon Wars. In one embodiment, the incentive reward may improve based on the price of the item. For example, the incentive reward for a $50 boombox may be $5000 in virtual poker chips in Zynga Poker, but the incentive reward for a $1000 home stereo system may be $200,000 in virtual poker chips.

In various embodiments, it is possible that the offer search system offers an incentive reward for one or more games hosted by game system 320b. Game system 320b may host multiple multiuser online games. A particular user may play one or more of these games and control one or more player characters in each game. If the user plays more than one game on game system 320b, the offer search system may determine it is appropriate to generate an incentive reward for one or more of these games. The offer search system can determine which game or games to generate offers for by examining the user's game account information with respect to each game and analyzing a variety of factors from that information (e.g., the user's frequency of play, duration of play, play preferences, social network information, etc.). For example, if User 101 plays Zynga Poker on average ten hours a week, but only plays Zynga Mafia Wars on average five hours per week, the offer search system may determine that User 101 prefers playing Zynga Poker and may only generate an incentive reward offer only for that game. Alternatively, the offer search system may offer an incentive reward for Zynga Mafia Wars instead as an means of encouraging User 101 to increase his game play time in that game. In another embodiment, the offer search system may offer an incentive reward for a game hosted by game system 320*b* that a user has never played, even if the user plays other games on game system 320*b*. For example, if User 101 has only played Zynga Poker on game system 320*b*, the offer search system may generate an incentive reward for another game hosted by game system 320*b* (e.g., Zynga Mafia Wars, Zynga YoVille, etc.) to encourage User 101 to try a new game. The offer search system may also consider a user's social network information for multiuser online games that interface with social networking systems. For example, if User 101 has twenty friends who play Zynga Poker but fifty friends who play Zynga Mafia Wars, the offer search system may determine that User 101 prefers playing Zynga Mafia Wars and generate only generate an incentive reward offer for that game. It is also possible for the offer search system to generate incentive reward offers for multiple games, and for a user to receive an incentive reward in multiple games. For example, if User 101 plays both Zynga Poker and Zynga Mafia Wars, the offer search system may offer an incentive reward of $10,000 virtual poker chips (for Zynga Poker) and a virtual submachine gun (for Zynga Mafia Wars). Alternatively, the offer search system may generate an offer that includes an incentive reward for each game, but the offer requires the user to choose which game he wants to receive the reward in. For example, using the previous example, the offer search system might offer User 101 an incentive reward of $10,000 virtual poker chips and a virtual machine gun, but require User 101 to choose which of the two rewards he wants.

The offer search system can use various combinations of the above methods to determine an appropriate incentive reward. Various embodiments may use one or more methods described above individually or in combination.

Offering Incentive Reward During a Merchant System Transaction

A variety of processes can be used to determine and present incentive reward offers to a user. FIG. 2 shows one such example process 200. At step 210, a particular user, User 101 of merchant system 320*b* can access, via the user's client system 330, the online catalog webpage of a particular item. The user's browser client 110 can load and render the content of the webpage. Merchant system 320*b* may also access the user's merchant system account information and/or the user's game system account information. This account information may be accessed in a variety of ways. For example, merchant system 320*a* could access data stored in a cookie on client system 330, that is appended to messages transmitted from client system 330 to merchant system 320*a*. This allows merchant system 320*a* to identify User 101 and access the appropriate account information from merchant data store 345. To access User 101's game system account information, merchant system 320*a* may directly query game system 320*b*. Alternatively, the item catalog page may include code (e.g., HTML, etc.) instructing the client system 330 to call game system 320*b* to retrieve HTML code and/or script. For example, incentive reward offer section 160 of catalog page 100 provided by merchant system 320*a* may be implemented in an iframe with a "src" tag identifying the URL of game system 320*b*. When client system 330 consumes the HTML or other code of the catalog page, client system 330 transmits a request to game system 320*b*. In one implementation, the request includes a browser cookie or other state object appended there to that allows game system 320*b* to resolve the identified of User 101 (and possibly all or a subset of game state information associated with that user). If a script is used (e.g., JavaScript), the script when downloaded and executed might be operative to scan various attributes of catalog page 100 to identify the subject of the proposed transaction (e.g., the purchase of a katana as shown in FIG. 1) and transmit this transaction attribute data to game system 320*b*. For example, the catalog page may include semantic tags that identify elements of the page that correspond to a product type, an amount of purchase and the like. Game system 320*b* may use this information to consider what type of incentive to offer a user. As mentioned above, in response to the call from client system 330, game system 320*b* may access data stored in the cookie corresponding to the game system 320*b*, thereby allowing the game system to identify User 101 at step 220. If game system 320*a* is able to successfully identify User 101 as a player in one or more online games hosted by game system 320*b*, it can then trigger the incentive offer search system.

In some embodiments, even if User 101 is not a player in game system 320*b*, the process may include offering an alternative type of incentive reward to User 101, such as an in-game benefit or asset that is not normally provided to new players. This might be done, for example, to encourage User 101 to establish a user account on game system 320*b*. For example, if User 101 is not a user of any game hosted by game system 320*b*, User 101 might be presented with an incentive reward offer of $100,000 virtual poker chips if he orders the item on catalog page 100 and joins Zynga Poker, where a typical new poker player only receives $20,000 virtual poker chips in that game. In other implementations, if User 101 is not a user of any game hosted by game system 320*b*, the offer search system may initiate a default workflow, such as offering an ad to join a game hosted by game system 320*b*. If no incentive rewards, advertisements, or other incentives to encourage User 101 to join the game are presented, then the process ends 290.

The offer search system can determine an appropriate incentive reward to offer User 101 at step 250. An appropriate incentive reward can be determined in a variety of ways. Once the offer search system has identified a reward, it can respond to the call from client system 330 with content that includes details of the incentive reward to be displayed in offer section 160 at step 260. The incentive reward offer may be rendered, for example, in a discrete section of the item catalog page viewed by User 101. For example, in the item catalog page 100 shown in FIG. 1, the incentive reward is rendered in box 160, adjacent to the purchasing information 120. The incentive reward box 160 can include a variety of information about the incentive reward, including a description of the in-game reward, an image, and other details, as instructed by the script and other content transmitted in the response received from game system 320*b*. In one implementation, game system 320*b* may generate a unique offer identifier that is associated with the incentive reward offer transmitted to client system 330. The offer identifier can be included in the HTML code that becomes part of a Document Object Model (DOM) of the catalog page as maintained by the browser client or other client application. If User 101 places an order for the item described in the item catalog page at step 270, merchant system 320*a* may record the unique offer identifier in association with the incentive reward offer. After User 101 places an order for the item, merchant system 320*a* may transmit data to game system 320*b* indicating that an order has been placed. This can be done in a variety of ways. For example, after placing the order, User 101's browser client might be redirected to an order confirmation webpage that includes an embedded tracking pixel that initiates a callback to game system 320*b*. The tracking pixel URL may include the unique offer identifier as a parameter string, allowing the game system 320*b* to correlate the previously transmitted offer to the purchase transaction. Once game system 320*b* has confirmed that User 101 has placed an order for the item on merchant system 320*a*, the game system can then provide the incentive reward to User 101 or his player character at step 280. For example, the game system 320*b* may update the user's account to add the in-game reward to his in-game asset list, which will be presented or available to the user the next time he accesses the game. The entities associated with the game system 320*b* and merchant system 320*a*, to the extent they are separate, can contract to achieve a variety of revenue exchange or sharing paradigms that arise out of the incentive offers described herein. For example, the entity associated with the game system 320*b* may receive a payment for each completed transaction. In another implementation, the entity associated with the game system 320*b* may receive a payment when the User 101 redeems the award.

Other processes are possible for determining and presenting an incentive reward offer to a user. For example, a variety of process steps and data flows are possible. The processes and data flows described above, as well as alternatives, are described in more detail below.

Offering In-Game Rewards as Incentives for Performing Other Online Actions

One skilled in the art would appreciate that the examples described above and in FIGS. 1 and 2 with respect to merchant transactions are presented merely as an example embodiment of offering incentive rewards for one type of online action. However, the present disclosure is intended to encompass offering incentive rewards for a variety of online actions. In one example, incentive rewards could be offered to users of an online media system (e.g., YouTube, Hulu, Yahoo!, etc.) to encourage these users to view certain content. In another example, incentive rewards could be offered to users of an online reviewing system (e.g., Yelp, Zagat Online, SiteJabber, etc.) to encourage these users to input user reviews. In yet another example, incentive rewards could be offered to users of online search engines (e.g. Google, Bing, Yahoo!, etc.) to encourage these users to click on advertisements or sponsored links. The disclosed incentive offer search system, methods for determining an incentive rewards, and methods for offering an incentive reward would perform analogously with these online systems as with merchant systems.

Data Flow

Figure 3:
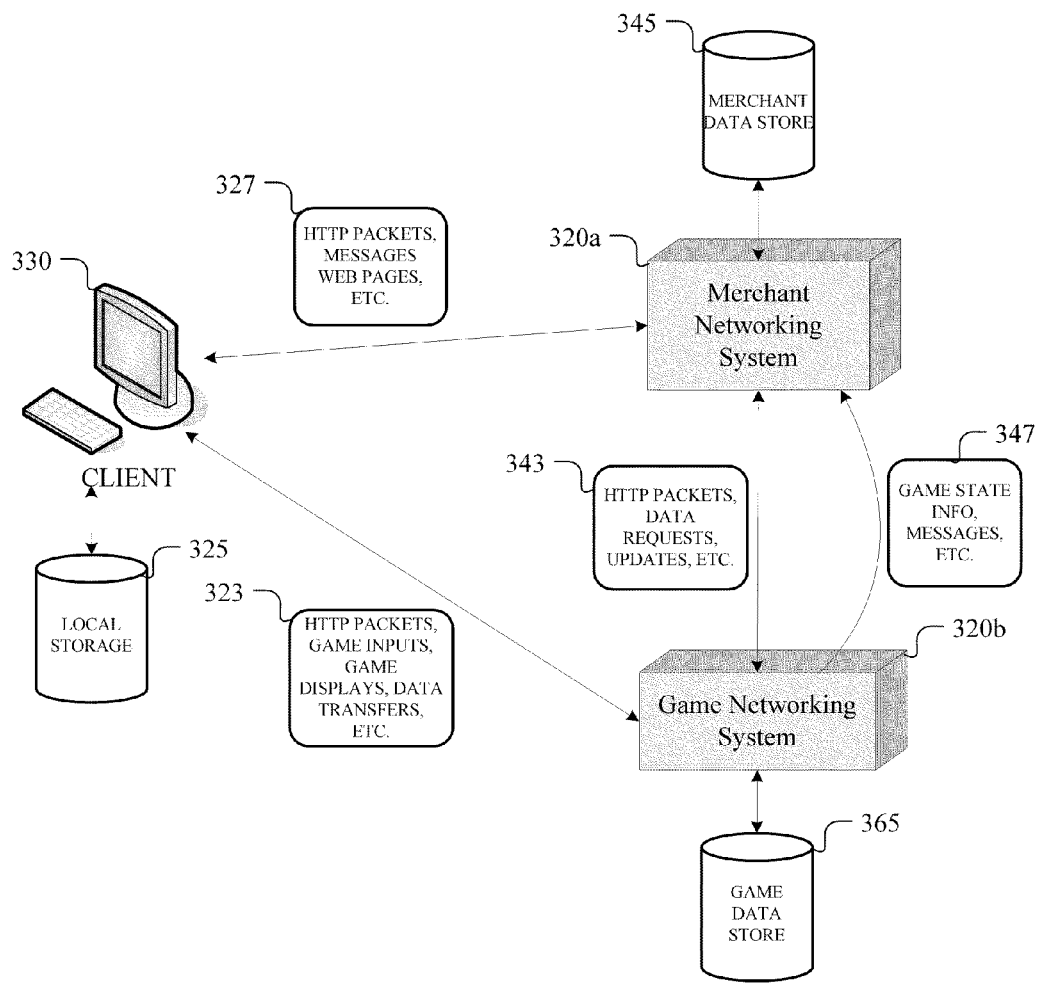
FIG. 3 depicts a schematic of a system and data flow.

FIG. 3 depicts a schematic of system 300 and data flow between the components of system 300. System 300 can include a client system 330, a merchant networking system 320*a* and game networking system 320*b*. Client system 330, merchant networking system 320*a* and game networking system 320*b* can each have a corresponding data store such as local storage medium 325, merchant data storage medium 345 and game data storage medium 365, respectively. Client system 330 can communicate with merchant networking system 320*a* to receive webpages, messages, etc. Additionally, client system 330 can transmit data to and receive data 323 (e.g., game inputs, incentive offer information, data transfers, etc.) from game networking system 320*b*. In a similar fashion, game networking system 320*b* and merchant networking system 320*a* can communicate HTTP packets 343 including data requests, transaction information, updates, etc. At some other time, or at the same time, game networking system 320*b* can communicate data 347 (e.g., game state information, game system account information, page info, messages, etc.) with merchant networking system 320*a*.

Communication between client system 330, merchant networking system 320*a* and game networking system 320*b* can occur over any appropriate electronic communication medium or network using any suitable communications protocols. For example, client system 330, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP) and other communications protocols, such as HTTP-S, FTP, SNMP, TELNET, and a number of other protocols, may be used. In addition, a server in one interaction context may be a client in another interaction context. Still further, in particular implementations, the information transmitted between hosts may be formatted as HyperText Markup Language (HTML) documents. Other structured document languages or formats can be used, such as XML, and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In one implementation, for example, a client request may cause a server to respond with a first data object, such as an HTML page, which itself refers to other data objects. A client application, such as a browser, will request these additional data objects as it parses or otherwise processes the first data object.

The example data flows in this section are presented with respect to data flow between merchant networking systems and game networking systems. One skilled in the art would appreciate that these are presented merely as an example of a data flow between two types of online systems. However, the present disclosure is intended to encompass data flows between a game networking system and a variety of other online systems, such as online media systems, online reviewing systems, online search engines, and online advertising systems. The example data flows described herein function analogously with these online systems as with merchant networking systems.

Iframes

FIG. 1 illustrates an example webpage 100 rendered within a browser window. The webpage can includes multiple module windows embedded in webpage as iframes. For example, content 120, 130, 150, and 160 could each comprise separate iframe modules or separated by <divs> tags. Multiple modules could be implemented using HTML code that a browser client can process to render webpage 100 within the browser window, for example:

```
<html>
<head><title>Merchant Webpage</title></head>
...
<body>
    <iframe id=module_A src="http://gamehost1.com/path/module_A
    ?token=<transaction parameter string>&<domain information of
    merchant>"
    height="100" width="200" frameborder=" 1" scrolling="no">
    </iframe>
...
</body></html>
```

This example HTML code includes an iframe element. The "src" element causes the browser client to transmit a request to game system 320b and load in the content corresponding to the uniform resource locator (URL) within the context of the iframe. In one implementation, the URL includes a string of transaction parameters that describe one or more aspects of the proposed transaction and the domain information or other identifier of the merchant (e.g., www.amazon.com). In one implementation, merchant networking system 320a provides modules, as shown above, within the iframe elements from origins that differ from the origin of webpage 100. For example, the content corresponding to a first module (e.g., module_A) could be served from a first host (e.g., gamehost1.com). The content of the iframe module can be illustrated with the following example HTML code:

```
<html>
<head><script src="messenger.js?offerID=offernum"></script></head>
<body>
    <h1> Zynga Special Offer </h1>
    <div>
    [OFFER CODE HERE]
    </div>
    <script>
    loadOfferFromZynga( );
    advertiseOffer( );
    </script>
</body></html>
```

This example HTML code includes some pseudocode to represent module interconnection and other functions of an HTML document corresponding to "module_A." The HTML code includes a script element (messenger.js) that causes a messenger script object to be loaded within the module iframe. The data locator for the messenger script also includes an offer identifier (offerID). The messenger script, when loaded and executed, is operative to embed another iframe (referred to herein as a "messenger iframe" within the module iframe). In one implementation, the messenger script accesses the object model of the HTML document of the module iframe and adds HTML code to create the messenger iframe at runtime. The messenger iframe is a child element of the module iframe. In some implementations, the messenger iframe is not visible or rendered within browser window.

The following provides example code for purposes of illustration:

```
<iframe src=http://merchant.com/messenger?token=offerID #[{... ...},
    {... ... ...},{... ... ...},{... ... ...},{... ... ...}]>
</iframe>
```

Since the origin indicated in the src attribute of the messenger iframe element is the same origin as webpage 100, objects of the webpage 100 can interact with the content of the messenger iframe. Content of the module iframe, however, cannot interface with content of the webpage 100 or the messenger iframe. The src attribute of the messenger iframe element may also include the offer identifier (here, offerID). The src URL of the messenger iframe element may also include an encoded string (after #) that operates as a message queue. In a particular embodiment, the encoded string uses JavaScript Object Notation (JSON) to implement the message queue, where each message is delimited using the JSON syntax. According to the domain security model of most browser clients, the messenger script may initially set the location (src) of the messenger iframe element, and also to reset this location after the messenger iframe has been created. Further, given that the location (src) of the messenger iframe element is set to the same origin as webpage 100, a script such as a shopping cart script embedded in webpage 100 may access the location (src) and the encoded string to determine what messages are in the message queue, such as an offerID. The shopping cart script may also be able to modify the message queue to add new messages and delete expired ones (such as adding an indication that the user has added the item to a shopping cart). Still further, the messenger script, even though it operates within the context of the module iframe, is still able to read and modify the location (src) attribute.

Page Generation and Embedding of Incentives

In an alternative embodiment, the incentive reward offer section 160 may also include one or more activatable elements, such as a hyperlink, that triggers an incentive redemption workflow in connection with a proposed transaction. In some implementations, rather than passing parameters of the transaction in URL parameter strings, a code object may scan the contents of the web page to identify elements of the proposed transaction. In a particular implementation, a user may access a network application hosting site, such as merchant networking system 320a, over computer network with a client system 330 to view a network resource, such as a merchant catalog page 100. For example, a user may access a network application hosting site to access an account, and purchase an item. In one implementation, a special-purpose client application may be used to interact with the network application hosting site. In another implementation, client computer 330 includes a browser or other client application that parses and displays Hyper-Text Markup Language (HTML) pages transmitted from the network application hosting site.

Some sites, in connection with hosting and displaying content, provide content-embedding code in a field on a page displaying the content. When parsed by a browser or other client application, for instance, the content-embedding code causes the browser to retrieve the content and display it. The content-embedding code may be incorporated into a variety of systems, such as merchant systems, game systems, and social networking systems. For example, the content-embedding code may be incorporated into merchant catalog webpage (e.g., Amazon.com, etc.). As described below, content-embedding code can be used to generate and include incentives in catalog or other pages that offer products and/or services.

Various processes are possible for creating and inserting content and one or more links into a given section, such as section 160, of underlying content in response to identifying one or more attributes of an underlying page. The illustrated process can operate within a section of a structured document or page. For HTML pages, a section can be defined by <frame> or <div> tags or elements. Sections may also be defined based on a combination of structured document tags or elements. In one embodiment, the process can be implemented by a script or other embedded code module embedded within an HTML page and operative within the context of a browsing application.

In various embodiments, a page template may include certain elements. For example, the header section of the page template may contain a script, or calls to retrieve a script, that dynamically generates one or more aspects of the links provided when the embedded content is displayed, such as:

```
<html><head>
    <script language="JavaScript"
    src="http://incentives.zynga.com /js/incentives.js">
    </script>
</head>
```

The incentives.js code, when loaded and executed within the context of the web page 100, may scan various textual, structural and/or semantic elements of the page to identify various attributes of the offered item(s) on the page. For example, the script may access the DOM of the underlying HTML page to extract and process information. The script may process the data of a given section in an underlying HTML page to extract one or more keywords or other data that may be useful, for example, in offer selection or keyword extraction for a search system. The incentives.js code may transmit this information to game system 320b, which computes an incentive offer and transmits this information back to the incentives.js script. These script functions can interact with the Document Object Model (DOM) of the page to perform one or more tasks. Scripts may also be used to make calls to remote servers after an HTML page has loaded. These calls can obtain new information or data, which additional script code can merge with the DOM of the existing page so that it is displayed or otherwise rendered. For example, the script, when executed, may cause the client application to query game networking system 320b for a game information URL, and then render the identified content as a clickable region that, when clicked, resolves to the game information URL.

The following is an example of HTML code that can be inserted into offer section 160 by a script:

```
<p>
    <img width="380" border="2"
    src="http://static.zynga.com/81/241933979_f838b26575.jpg?v=0" style="margin:
    0px;" />
    <br />
    <a
    href="http://www.gamesystem.com/?offerID=offernum&transID=transnum;redrct
    =www.merchant.com/?offerID=offernum&transID=transnum</a>;
</p>
```

In the example shown, the src element may be an image file (e.g., a JPG) graphically illustrating an offer (alternatively the offer can be expressed by a combination of graphics and HTML code) and the href element may correspond to a hypertext link that, when activated, initiates a workflow to redeem the incentive and initiate the purchase transaction. One or more of the resource locators or indicators in the content embedding code may be formatted as hypertext links, which can be activated by a user click.

In one implementation, the offer locator may be embodied in a hypertext link including the URL of game system 320b, and include redirection parameters to merchant system 320a. When the offer link is activated, the client application transmits a request to game system 320b, which logs the event (including the offerID and a transaction identifier) and transmits a redirection message to the browser. The redirection message redirects the client application to the network resource identified in the "redrct" parameter field, here, merchant system 320a. The use of redirection messages allows game system 320b to track offer redemption. Merchant system 320a, when it receives the message, may retrieve trans-action information corresponding to the transID field and complete the transaction with the user.

In some embodiments, redirection messages are used. Redirection generally refers to transmitting a message from a server to a client application, for example, that causes the client application to access another server or resource without intervention or action by the end-user. Redirection can be accomplished in a number of different ways. For example, in connection with HTTP, redirection messages can be implemented using refresh meta tags, such as:

```
<html><head>
<meta http-equiv="refresh" content="0; url=http://www.zynga.com/">.
```

In addition, redirection messages can be implemented using HTTP refresh headers. For example:
HTTP/1.1 200 ok
Refresh: 0; url=http://www.zynga.com/
Content-type:
text/html
Content-length: 78
Follow <a href="http://www.zynga.com/">link</a>.

Redirection can also be accomplished by transmitting an HTML page including JavaScript code operative to accomplish redirection. Other suitable redirection methods can be used for other protocol environments.

Tracking Pixels

In various embodiments, pixels may be used to collect and report information about a webpage viewed by a user. For example, after a user completes a transaction on merchant networking system 320a, a pixel embedded into an order confirmation webpage may initiate a callback to game networking system 320b to confirm that the transaction is completed. A reporting pixel is usually a one-by-one pixel that may be placed anywhere in a webpage, but preferably at an inconspicuous or unobtrusive location. For example:
   <img src="http://pixel.zynga.com/pixel?id=80437&t=2" width="1" height="1"/>

Each time the webpage is served in response to a client request, the reporting pixel initiates a callback to a server associated with the reporting pixel, indicating that the webpage has been viewed and optionally reporting additional information such as the identification of the reporting pixel, the date and time the webpage is served, and/or the publisher of the webpage, etc. The server may be associated with game networking system 320b, merchant networking system 320a, or other systems or networks. Information collected using the above method is real-time information, because as soon as the webpage is served (i.e., loaded in a client browser), the macro associated with the reporting pixel initiates the callback to the associated server. The server can collect and aggregate information from multiple callbacks for a period of time to determine the total number of times the webpage has been viewed during that period. A webpage may have one or more embedded pixels, which may report to one or more servers.

Systems and Methods

In various example embodiments, one or more described webpages may be associated with a networking system or networking service. However, alternate embodiments may have application to the retrieval and rendering of structured documents hosted by any type of network addressable resource or web site. Additionally, as used herein, a "user" may be an individual, a group, or an entity (such as a business or third party application).

Figure 4:
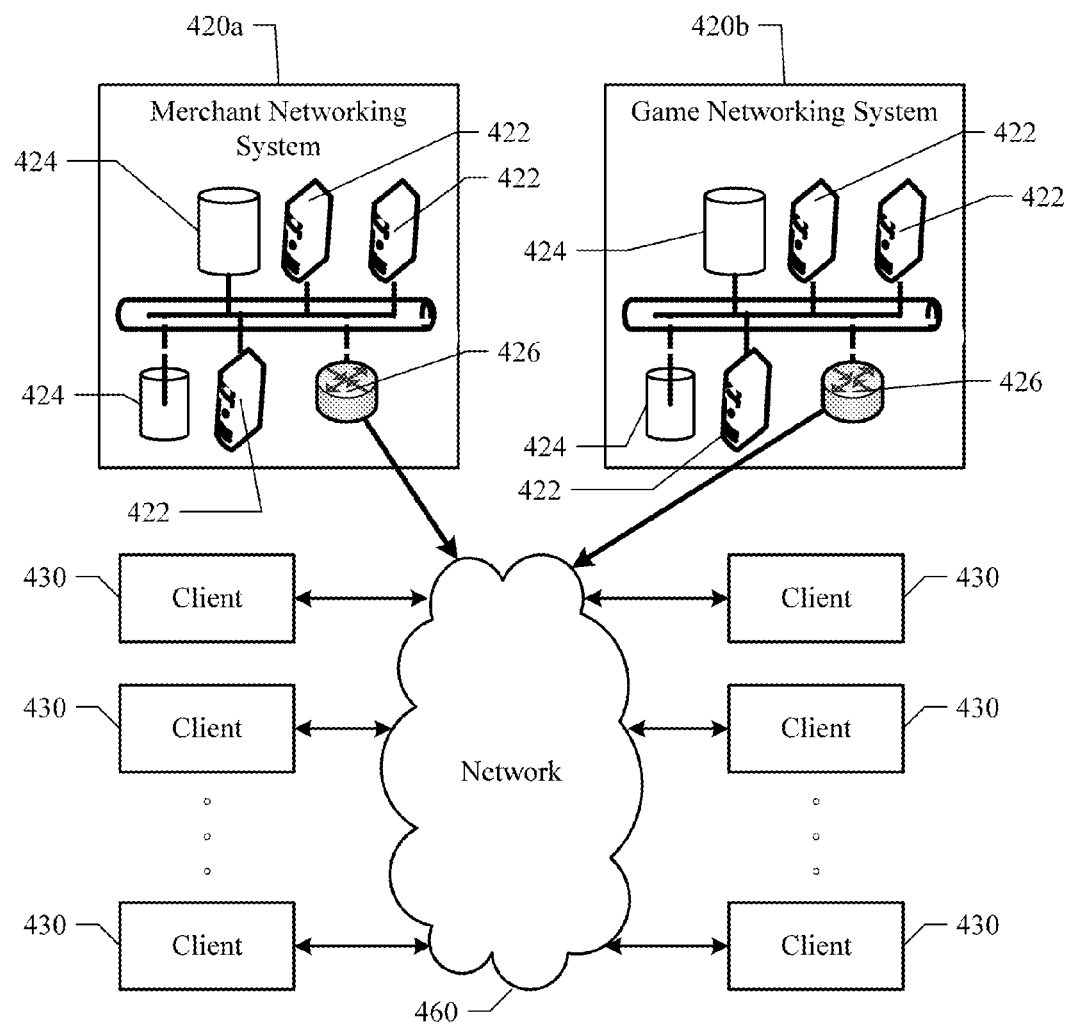
FIG. 4 illustrates an example network environment.

Particular embodiments may operate in a wide area network environment, such as the Internet, including multiple network addressable systems. FIG. 4 illustrates an example network environment, in which various example embodiments may operate. Network cloud 460 generally represents one or more interconnected networks, over which the systems and hosts described herein can communicate. Network cloud 460 may include packet-based wide area networks (such as the Internet), private networks, wireless networks, satellite networks, cellular networks, paging networks, and the like. As FIG. 4 illustrates, particular embodiments may operate in a network environment comprising one or more networking systems, such as merchant networking system 420a and game networking system 420b, and one or more client devices 430. The components of merchant networking system 420a and game networking system 420b operate analogously; as such, hereinafter they may be referred to simply at networking system 420. Client devices 430 are operably connected to the network environment via a network service provider, a wireless carrier, or any other suitable means.

Networking system 420 is a network addressable system that, in various example embodiments, comprises one or more physical servers 422 and data stores 424. The one or more physical servers 422 are operably connected to computer network 460 via, by way of example, a set of routers and/or networking switches 426. In an example embodiment, the functionality hosted by the one or more physical servers 122 may include web or HTTP servers, FTP servers, as well as, without limitation, webpages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), Flash, ActionScript, and the like.

Physical servers 422 may host functionality directed to the operations of networking system 420. Hereinafter servers 422 may be referred to as server 422, although server 422 may include numerous servers hosting, for example, networking system 420, as well as other content distribution servers, data stores, and databases. Data store 424 may store content and data relating to, and enabling, operation of the networking system 420 as digital data objects. A data object, in particular implementations, is an item of digital information typically stored or embodied in a data file, database or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 424 corresponds to one or more of a variety of separate and integrated databases, such as relational databases and object-oriented databases, that maintain information as an integrated collection of logically related records or files stored on one or more physical systems. Structurally, data store 424 may generally include one or more of a large class of data storage and management systems. In particular embodiments, data store 424 may be implemented by any suitable physical system(s) including components, such as one or more database servers, mass storage media, media library systems, storage area networks, data storage clouds, and the like. In one example embodiment, data store 424 includes one or more servers, databases (e.g., MySQL), and/or data warehouses. Data store 424 may include data associated with different networking system 420 users and/or client devices 430.

Client device 430 is generally a computer or computing device including functionality for communicating (e.g., remotely) over a computer network. Client device 430 may be a desktop computer, laptop computer, personal digital assistant (PDA), in- or out-of-car navigation system, smart phone or other cellular or mobile phone, or mobile gaming device, among other suitable computing devices. Client device 430 may execute one or more client applications, such as a web browser (e.g., Microsoft Internet Explorer, Mozilla Firefox, Apple Safari, Google Chrome, and Opera, etc.), to access and view content over a computer network. In particular implementations, the client applications allow a user of client device 430 to enter addresses of specific network resources to be retrieved, such as resources hosted by networking system 420. These addresses can be Uniform Resource Locators, or URLs. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is the Hypertext Markup Language (HTML). Other common web browser-supported languages and technologies include the Extensible Markup Language (XML), the Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications and other objects that can be embedded within the page. Generally, a webpage may be delivered to a client as a static document, however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client device 430 desires to view a particular webpage (hereinafter also referred to as target structured document) hosted by networking system 420, the user's web browser, or other document rendering engine or suitable client application, formulates and transmits a request to networking system 420. The request generally includes a URL or other document identifier as well as metadata or other information. By way of example, the request may include information identifying the user, such as a user ID, as well as information identifying or characterizing the web browser or operating system running on the user's client computing device 430. The request may also include location information identifying a geographic location of the user's client device or a logical network location of the user's client device. The request may also include a timestamp identifying when the request was transmitted.

The example network environment described above and in FIG. 4 is presented with respect to merchant networking systems and game networking systems. One skilled in the art would appreciate that these are presented merely as an example of a network environment between two types of online systems. However, the present disclosure is intended to encompass network environments that include a game networking system and a variety of other online systems, such as online media systems, online reviewing systems, online search engines, and online advertising systems. The example network environment described above performs analogously with these other online systems as with merchant networking systems.

Figure 5:
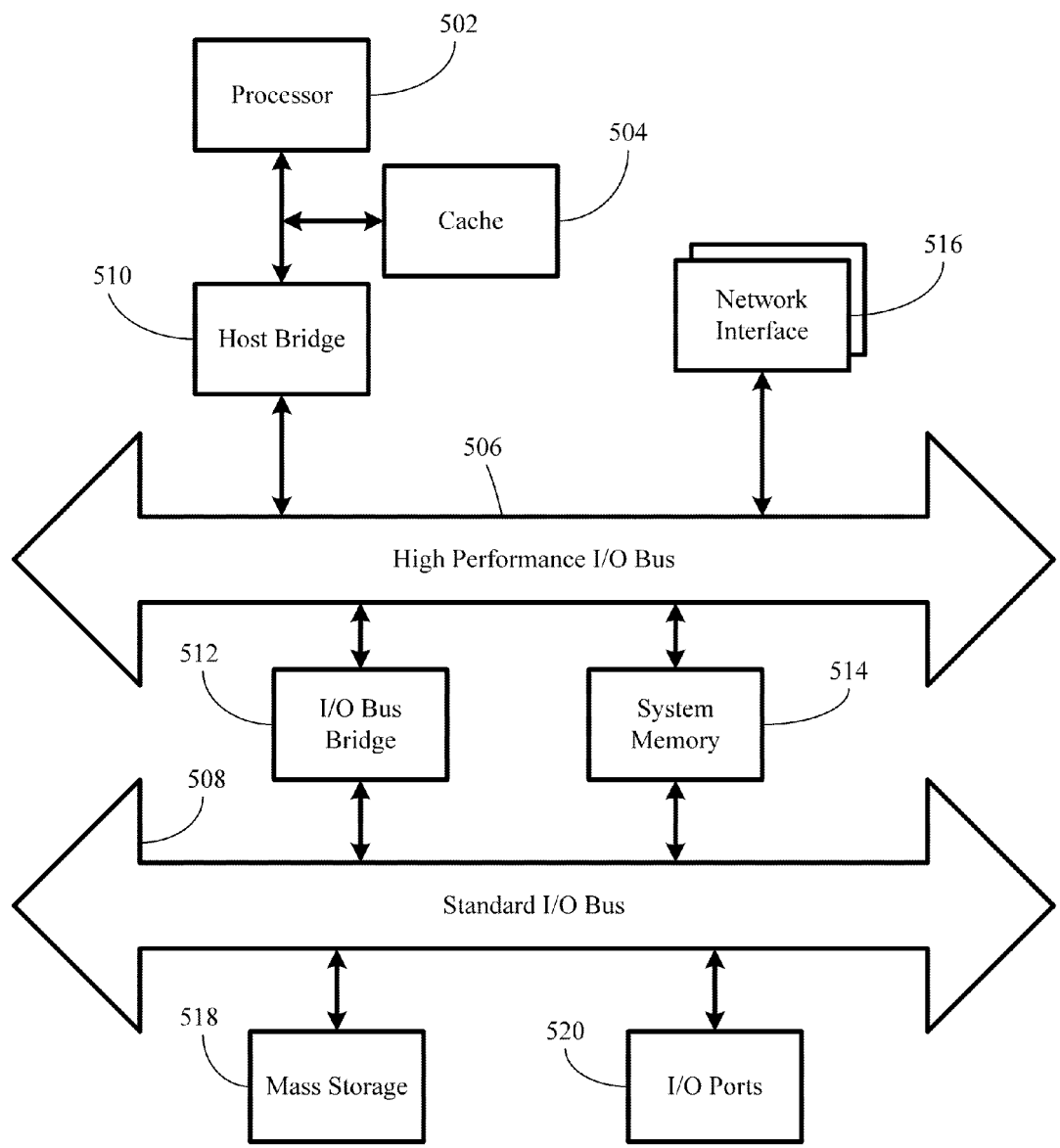
FIG. 5 illustrates an example computer system architecture.

FIG. 5 illustrates an example computing system architecture, which may be used to implement a server 422 or a client device 430. In one embodiment, hardware system 500 comprises a processor 502, a cache memory 504, and one or more executable modules and drivers, stored on a tangible computer readable medium, directed to the functions described herein. Additionally, hardware system 500 may include a high performance input/output (I/O) bus 506 and a standard I/O bus 508. A host bridge 510 may couple processor 502 to high performance I/O bus 506, whereas I/O bus bridge 512 couples the two buses 506 and 508 to each other. A system memory 514 and one or more network/communication interfaces 516 couple to bus 506. Hardware system 500 may further include video memory (not shown) and a display device coupled to the video memory. Mass storage 518, and I/O ports 520 couple to bus 508. Hardware system 500 may optionally include a keyboard and pointing device, and a display device (not shown) coupled to bus 508. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 500 are described in greater detail below. In particular, network interface 516 provides communication between hardware system 500 and any of a wide range of networks, such as an Ethernet (e.g., IEEE 802.3) network, a backplane, etc. Mass storage 518 provides permanent storage for the data and programming instructions to perform the above-described functions implemented in servers 422, whereas system memory 514 (e.g., DRAM) provides temporary storage for the data and programming instructions when executed by processor 502. I/O ports 520 are one or more serial and/or parallel communication ports that provide communication between additional peripheral devices, which may be coupled to hardware system 500.

Hardware system 500 may include a variety of system architectures; and various components of hardware system 500 may be rearranged. For example, cache 504 may be on-chip with processor 502. Alternatively, cache 504 and processor 502 may be packed together as a "processor module," with processor 502 being referred to as the "processor core." Furthermore, certain embodiments of the present invention may not require nor include all of the above components. For example, the peripheral devices shown coupled to standard I/O bus 508 may couple to high performance I/O bus 506. In addition, in some embodiments, only a single bus may exist, with the components of hardware system 500 being coupled to the single bus. Furthermore, hardware system 500 may include additional components, such as additional processors, storage devices, or memories.

An operating system manages and controls the operation of hardware system 500, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other implementations are possible. For example, the functions described herein may be implemented in firmware or on an application specific integrated circuit.

Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the invention. The term "processing system" refers to a single processing device or a group of inter-operational processing devices. Some examples of processing devices are integrated circuits and logic circuitry. Those skilled in the art are familiar with instructions, computers, and storage media.

Miscellaneous

One or more features from any embodiment may be combined with one or more features of any other embodiment without departing from the scope of the invention.

A recitation of "a", "an," or "the" is intended to mean "one or more" unless specifically indicated to the contrary.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the processes described herein may be implemented using hardware components, software components, and/or any combination thereof. By way of example, while embodiments of the present disclosure have been described as operating in connection with a networking website, various embodiments of the present invention can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistance, personal gaming device, etc.), that makes API calls directly to a server. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

What is claimed is:

1. A method comprising, on one or more computing devices:
receiving a first message identifying a user, the first message corresponding to a proposed online action;
accessing game state information to identify one or more computer-implemented games associated with the user;
generating an incentive reward for the user based on a game state of one or more of the identified games, wherein the incentive reward is an in-game benefit corresponding to at least one of the one or more identified games; and
transmitting a second message, wherein the second message includes a description of the incentive reward.

2. The method of claim 1, wherein the in-game benefit comprises a virtual object having utility in one of the one or more identified games.

3. The method of claim 1, wherein the game state comprises a player character state of a player character in the game associated with the user.

4. The method of claim 3, wherein the player character state is the type or number of virtual objects owned by the player character.

5. The method of claim 1, further comprising:
receiving an indication that the user has completed the proposed online action.

6. The method of claim 5, wherein the proposed online action is viewing an online media content.

7. The method of claim 5, wherein the proposed online action is writing an online review.

8. The method of claim 5, wherein the proposed online action is viewing an online advertisement.

9. The method of claim 1, wherein the proposed online action is a proposed transaction between the user and a merchant.

10. The method of claim 9, further comprising:
receiving an indication of a conversion event corresponding to the proposed transaction between the user and the merchant.

11. The method of claim 9, wherein the first message further identifies one or more attributes of the proposed transaction.

12. The method of claim 11, wherein the incentive reward is based on the game state of one or more of the identified games and at least one of the one or more attributes of the proposed transaction.

13. The method of claim 12, wherein at least one attrib of the one or more attributes is a transaction amount.

14. The method of claim 1, further comprising:
selecting a game of the one or more identified games; and wherein the incentive reward is generated in part based on one or more game state parameters associated with the selected game.

15. The method of claim 14, wherein selecting the game comprises selecting the game of the one or more identified games based on an experience level of a player character in the game associated with the user.

16. The method of claim 14, wherein selecting the game comprises selecting the game of the one or more identified games based on a frequency of use of the game associated with the user.

17. An apparatus, comprising: one or more processors; and a memory coupled to the processors comprising instructions executable by the processors, the processors operable when executing the instructions to:
receive a first message identifying a user, the first message corresponding to a proposed online action;
access game state information to identify one or more computer-implemented games associated with the user;
generate an incentive reward for the user based on a game state of one or more of the identified games, wherein the incentive reward is an in-game benefit corresponding to at least one of the one or more identified games; and
transmit a second message, wherein the second message includes a description of the incentive reward.

18. The apparatus of claim 17, wherein the in-game benefit comprises a virtual object having utility in one of the one or more identified games.

19. The apparatus of claim 17, wherein the game state comprises a player character state of a player character in the game associated with the user.

20. The apparatus of claim 19, wherein the player character state is the type or number of virtual objects owned by the player character.

21. The apparatus of claim 17, wherein the processors are further operable when executing the instructions to:
receive an indication that the user has completed the proposed online action.

22. The apparatus of claim 21, wherein the proposed online action is viewing an online media content.

23. The apparatus of claim 21, wherein the proposed online action is writing an online review.

24. The apparatus of claim 21, wherein the proposed online action is viewing an online advertisement.

25. The apparatus of claim 17, wherein the proposed online action is a proposed transaction between the user and a merchant.

26. The apparatus of claim 25, wherein the processors are further operable when executing the instructions to:
receive an indication of a conversion event corresponding to the proposed transaction between the user and the merchant.

27. The apparatus of claim 25, wherein the first message further identifies one or more attributes of the proposed transaction.

28. The apparatus of claim 27, wherein the incentive reward is based on the game state of one or more of the identified games and at least one of the one or more attributes of the proposed transaction.

29. The apparatus of claim 28, wherein at least one attribute of the one or more attributes is a transaction amount.

30. The apparatus of claim 17, wherein the processors are further operable when executing the instructions to:
select a game of the one or more identified games; and wherein the incentive reward is generated in part based on one or more game state parameters associated with the selected game.

31. The apparatus of claim 30, wherein to select the game comprises selecting the game of the one or more identified games based on an experience level of a player character in the game associated with the user.

32. The apparatus of claim 30, wherein to select the game comprises selecting the game of the one or more identified games based on a frequency of use of the game associated with the user.

33. A method comprising, on one or more computing devices:
receiving a first message identifying a user, the first message corresponding to a proposed online action;
identifying one or more computer-implemented games from a plurality of computer-implemented games associated with the user;
generating an incentive reward for the user based on a selected game associated with the user, wherein the incentive reward is an in-game benefit corresponding to at least one of the one or more identified games; and
transmitting a second message, wherein the second message includes a description of the incentive reward.

* * * * *

UNITED STATES PATENT AND TRADEMARK OFFICE
CERTIFICATE OF CORRECTION

PATENT NO. : 8,328,642 B2  
APPLICATION NO. : 12/816584  
DATED : December 11, 2012  
INVENTOR(S) : Mosites et al.

Page 1 of 1

It is certified that error appears in the above-identified patent and that said Letters Patent is hereby corrected as shown below:

On the Title page, in column 2, item (56) under "U.S. Patent Documents", line 12, after "2012/0150695 A1 * 6/2012 Fan et al. ................. 705/27.1", insert
--FOREIGN PATENT DOCUMENTS
WO-2011159907 A2 12/2011
WO-2011159907 A3 12/2011--, therefor On the Title page, in column 2, item (56) under "Other Publications", line 1, delete "13/244,797 Response to Office Action" and insert --13/244,797, Response filed Mar. 16, 2012 to Non Final Office Action mailed Dec. 16, 2011--, therefor On the Title page, in column 2, item (56) under "Other Publications", line 4, delete "13/244,803 ," and insert --13/244,803,--, therefor On the Title page, in column 2, item (56) under "Other Publications", line 10, delete "Application Serial No.," and insert --"U.S. Appl. No. 13/244,822,--, therefor On the Title page, in column 2, item (56) under "Other Publications", line 12, before "Search", insert --International--, therefor In the Specification In column 10, line 62-63, delete "frameborder=" 1"" and insert --frameborder="1"--, therefor In the Claims In column 19, line 44, in claim 13, delete "attrib" and insert --attribute--, therefor In column 19, line 58, in claim 17, after "comprising:", insert --¶--, therefor Signed and Sealed this  
Twenty-first Day of October, 2014

Michelle K. Lee  
*Deputy Director of the United States Patent and Trademark Office*